United States Patent [19]

King

[11] Patent Number: 5,329,566

[45] Date of Patent: Jul. 12, 1994

[54] PLENUM SPRING AND GETTER ASSEMBLY

[75] Inventor: Harold B. King, Wrightsville Beach, N.C.

[73] Assignee: General Electric Company, San Jose, Calif.

[21] Appl. No.: 63,265

[22] Filed: May 17, 1993

[51] Int. Cl.⁵ .............................................. G21C 3/18
[52] U.S. Cl. ..................................... 376/418; 376/412
[58] Field of Search ........................ 376/412, 418, 420

[56] References Cited

U.S. PATENT DOCUMENTS 3,899,392  8/1975  Grossman et al. .................. 376/418
4,871,509 10/1989  Johansson ........................... 376/412

Primary Examiner—Daniel D. Wasil
Attorney, Agent, or Firm—J. S. Beulick

[57] ABSTRACT

A plenum spring and getter assembly for use in a nuclear fuel rod has a plenum spring design which retains the getter at a desired distance from the fuel column. The plenum spring is a wire having a first wound section of diameter greater than the diameter of the getter installed therein, a second wound section of diameter less than the getter diameter and a third wound section having a diameter which is preferably, but not necessarily, equal to the diameter of the first wound section. The wound sections are connected in series along an axis, with the "necked" second wound section being situated intermediate the first and third wound sections. When the fuel rod in accordance with the invention is installed upright in the reactor, the getter bears against and is supported by the first turn of the necked wound wire section.

20 Claims, 3 Drawing Sheets

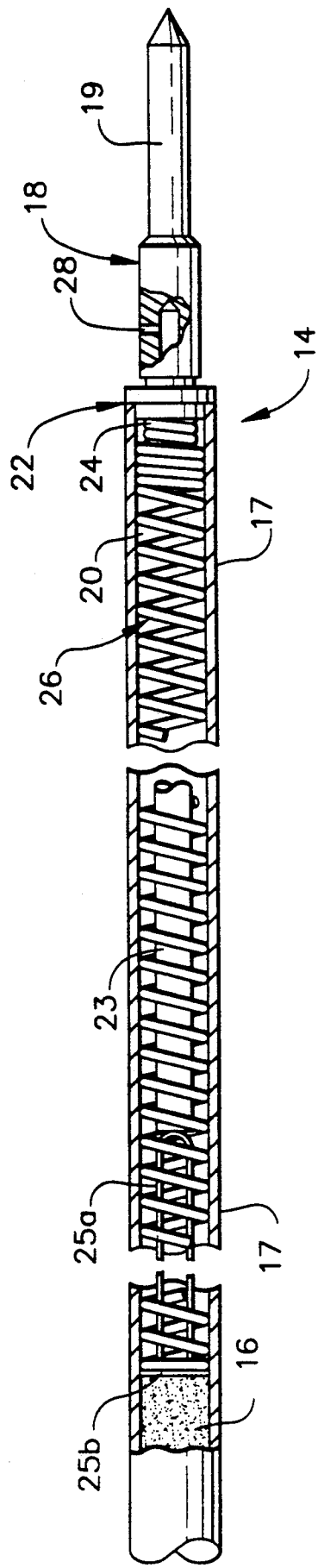
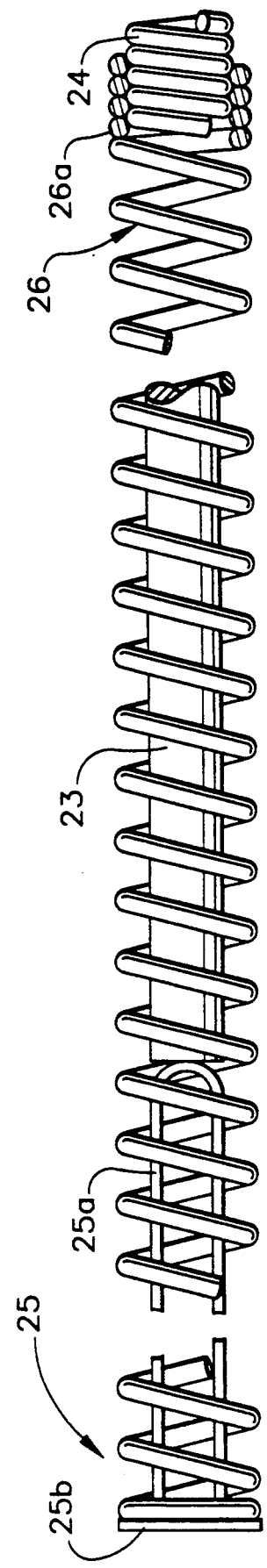
FIG. 2 (PRIOR ART)
FIG. 3 (PRIOR ART)

PLENUM SPRING AND GETTER ASSEMBLY

FIELD OF THE INVENTION

This invention generally relates to fuel rods in a nuclear reactor. More particularly, the invention relates to a compression spring for maintaining nuclear fuel pellets in proper position within a fuel rod during manufacture and shipment.

BACKGROUND OF THE INVENTION

The core of a nuclear reactor comprises a plurality of nuclear fuel bundle assemblies, each assembly consisting of a plurality of nuclear fuel rods. Each fuel rod comprises a circular cylindrical housing, i.e., cladding, which is sealed at both ends by respective end plugs. A plurality of nuclear fuel pellets are stacked in a vertical column inside the cladding to a height less than the length of the cladding, leaving a plenum space above the fuel column. A compression spring is placed inside the plenum for biasing the fuel pellets toward the bottom end plug of the fuel rod. A getter for removing contaminants from the interior atmosphere is conventionally installed inside the plenum.

The cladding serves two primary purposes: first, the cladding prevents contact and chemical reaction between the nuclear fuel and the coolant/moderator; and second, the cladding prevents the radioactive fission products, some of which are gases, from being released from the fuel rod into the coolant/moderator. Failure of the cladding, due to build-up of gas pressure or any other reason, could result in contamination of the coolant/moderator and associated systems by radioactive long-lived products to a degree which would interfere with plant operation.

Zirconium and its alloys, e.g., the Zircaloys, are excellent materials for use as nuclear fuel cladding because they have low neutron absorption cross sections and at temperatures below about 600° F., are extremely stable and nonreactive in the presence of demineralized water or steam, the most common reactor coolant/moderator. Within the confines of a sealed fuel rod, however, the hydrogen gas generated by a slow reaction between the cladding and residual water may reach a level which under certain conditions can cause localized hydriding of the zirconium alloy, accompanied by deterioration of mechanical properties. The cladding is also adversely affected by such gases as oxygen, nitrogen, carbon monoxide and carbon dioxide at all temperatures.

The zirconium alloy cladding of a nuclear fuel rod is exposed to contaminant gases during irradiation in a nuclear reactor even though these gases may not be present in the reactor coolant/moderator and may have been excluded as far as possible from the ambient atmosphere during manufacture of the cladding and the fuel rod. Sintered refractory and ceramic compositions, such as uranium dioxide and others used as nuclear fuel, release measurable quantities of the aforementioned gases upon heating, such as during fuel element manufacture and especially during irradiation. These gases react with zirconium alloy cladding to produce embrittlement, which endangers the integrity of the fuel rod. At high temperatures, water vapor reacts with zirconium alloys to produce hydrogen, which further reacts locally with the zirconium alloy to cause embrittlement. These undesirable results are exaggerated by release of these residual gases inside the sealed plenum, which increases the internal pressure within the cladding and thus introduces unanticipated stresses in the presence of corrosive conditions.

In light of the foregoing, it is desirable to minimize the amount of water, water vapor and other gases in the plenum during reactor operation. One approach is to insert a getter in the plenum. The getter is made of material which reacts chemically with water, water vapor and other gases to remove them from the plenum atmosphere. A getter material in the form of an alloy which rapidly reacts stoichiometrically with water, water vapor and reactive gases is disclosed in U.S. Pat. No. 3,899,392 to Grossman et al.

During loading of the fuel pellets into the cladding, the fuel rod is horizontally disposed. Also, the loaded fuel rods are maintained in a horizontal position when being transported. During transport of horizontal fuel rods, there is a risk that the relatively heavy fuel pellets will move from a compacted position into a non-compacted position.

The fuel rods are installed in the reactor in an upright position. If the fuel column has gaps, these gaps will not close due pellet wedging and friction. The presence of axial gaps would lead to undesirable consequences. Specifically, reactors operate under a pressure on the order of magnitude of 1,000 psi. Initially the pressure on the inside of the cladding is on the order of 200 psi. If a pellet becomes wedged inside the cladding, the misaligned pellet is spatially separated from adjacent pellets. The cladding in the area of pellet separation can neck down in response to the reactor pressure of the reactor, thereby holding the misaligned pellet out of place. Two consequences follow from a fuel rod with misaligned fuel pellets: first, the axial power distribution is altered to give high local powers near the axial gap in the fuel column, thereby causing local overheating of the fuel rod; and second, overstressing or cracking of the cladding can occur.

In view of these difficulties, it is conventional practice to install a compression spring in the plenum, which spring bears against the top of the fuel column to hold the fuel pellets in place during fabrication, and transport. The getter for absorbing residual contaminants in the hermetically sealed fuel rod is inserted inside the compression spring in most fuel rods. Sometimes it is desirable to keep the getter assembly a maximum distance from the top of the fuel column, e.g., by attaching the getter to the compression spring at a predetermined height above the fuel column.

SUMMARY OF THE INVENTION

The present invention is a plenum spring design which will retain the getter at a desired distance from the fuel column. The plenum spring in accordance with the preferred embodiment is a wire comprising a first wound section having a diameter greater than the diameter of the getter installed therein, a second wound section having a diameter less than the diameter of getter and a third wound section having a diameter which is preferably, but not necessarily, equal to the diameter of the first wound section. The wound sections are connected in series along an axis, with the "necked" second wound section being situated intermediate the first and third wound sections. When the fuel rod in accordance with the invention is installed upright in the reactor, the getter bears against and is supported by the first turn of the necked wound wire section.

The plenum spring in accordance with the invention does not need to be necked for more than one or two turns where the bottom of the getter is to reside in the spring. The reduced diameter at a desired position on the spring can be economically produced on modern state-of-the-art spring winding machines.

BRIEF DESCRIPTION OF THE DRAWINGS

FIG. 2 is a partial sectional view of an upper portion of the conventional fuel rod shown in FIG. 1.

FIG. 3 is a schematic diagram showing the plenum spring and getter assembly incorporated in the fuel rod of FIG. 2.

DETAILED DESCRIPTION OF THE PREFERRED EMBODIMENT

Figure 1:
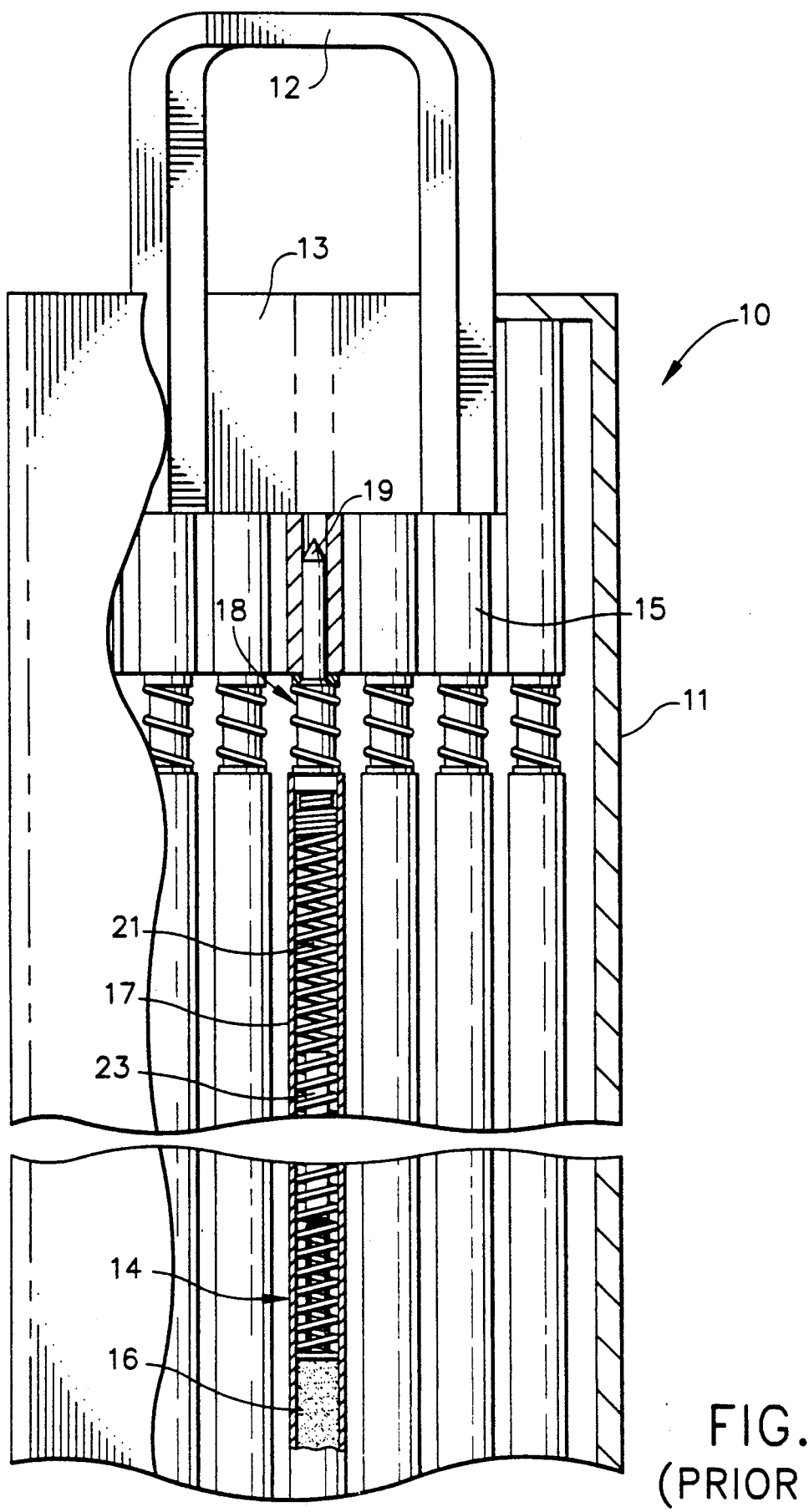
FIG. 1 is a partial sectional view of a nuclear fuel bundle assembly containing conventional nuclear fuel rods, one of which is shown partially sectioned.

The general structure of a nuclear fuel bundle assembly 10 for a boiling water nuclear reactor is shown in FIG. 1. The fuel bundle assembly consists of a tubular flow channel 11 of generally square cross section provided at its upper end with a lifting bale 12 and at its lower end with a nose piece (not shown). The upper end of channel 11 has an opening 13. The lower end of the nose piece is provided with coolant flow inlet openings (not shown). A plurality of fuel rods 14 are arranged in parallel inside the fuel channel 11. The top end of each fuel rod is held by an upper tie plate 15 and the bottom end of each fuel rod is held and supported by a lower tie plate (not shown). During reactor operation, recirculating liquid coolant, e.g., water, enters through the openings in the lower end of the nose piece, flows upwardly through the spaces between fuel rods 14 and discharges at upper outlet 13.

One conventional type of fuel rod has a circular cylindrical housing 17, i.e., cladding, made of corrosion-resistant metal, e.g., zirconium alloy. The nuclear fuel is housed in cladding 17 in the form of a column of stacked pellets 16 made of fissionable and/or fertile material. Each fuel pellet is a circular cylinder having planar end faces disposed perpendicular to the cylinder axis. The pellets are stacked with end faces in abutment. A preferred fuel is uranium dioxide or a mixture comprising uranium dioxide and plutonium dioxide.

The cladding 17 is sealed at both ends by means of end plugs 18, only one of which is shown in FIG. 2. The end plugs are also made of zirconium alloy. Each end plug is joined to the cladding by a circumferential weld generally indicated by numeral 22 in FIG. 2. Each end plug has a stud 19 which fits into a corresponding aperture in one of the tie plates to facilitate mounting of the fuel rod in the fuel bundle assembly.

During construction of the conventional fuel rod, a first end plug is inserted in an end of the cladding and welded circumferentially to form an airtight seal. The fuel pellets 16 are then inserted in the cladding to form a column, with the first pellet abutting the first end plug. When the fuel bundle assembly is installed upright in the reactor core, the fuel column has a height which is less than the height of the cladding, so that a void space or plenum 20 is provided at the upper end of the upright fuel rod.

In accordance with the construction of a known fuel rod, a standoff element 25 (see FIG. 3) comprising a U-shaped standoff wire 25a welded to a wafer-shaped base 25b is installed in plenum 20. The wafer-shaped base 25b sits on the top surface of the last pellet in the fuel column. Standoff element 25 supports a getter 23 at a predetermined height above the fuel column.

Conventional getters for eliminating water, water vapor and other undesirable gases from the plenum can be utilized. One known getter comprises a hollow gas-permeable container filled with getter material. The container is a stainless steel housing having a multiplicity of openings which permit gases and liquids in the plenum to enter the container. The preferred getter material is a ternary alloy in particulate form to maximize the surface area per unit weight of getter material. In particular, a ternary alloy of zirconium, nickel and titanium may be used as taught by U.S. Pat. No. 3,899,392.

The conventional fuel rod shown in FIGS. 2 and 3 further comprises a coiled compression spring 26 installed in plenum 20. The inner diameter of plenum spring 26 is greater than the width of the U-shaped standoff wire 25a, to allow the standoff element 25 to be slid into spring 26 to a point where the latter abuts wafer-shaped base 25b. The outer diameter of plenum spring 26 is slightly less than the inner diameter of cladding 17 in order to provide internal support for that part of cladding 17 which surrounds plenum 20 and is not otherwise radially outwardly supported against the external pressure of the moderator/coolant fluid. Plenum spring 26 also serves to maintain the position of the fuel pellets during handling and transportation of the fuel rods by biasing the fuel pellets toward the plugged end adjacent to the fuel column.

The plenum 20 is closed off by welding the second end plug 18 in the opposite end of cladding 17. This end plug is made of zirconium alloy. In contrast, the plenum spring 26 is stainless steel. Thus, if plenum spring 26 were in direct contact with end plug 18 during welding of the latter to cladding 17, the heat produced during welding could cause a chemical reaction between the stainless steel and the zirconium alloy. Such a chemical reaction can cause contamination of the end plug and possibly the weld.

To obviate this problem, an insert 24 made of Zircaloy is installed between end plug 18 and plenum spring 26. The conventional insert 24 is a tightly wound wire which does not act like a spring. Plenum spring 26 is provided at its end with a tightly wound wire portion 26a dimensioned to snugly receive the screwed-in insert 24.

In accordance with this known construction, getter 23 and standoff element 25 are slid into one end of plenum spring 26 and insert 24 is screwed into the other end. Then the entire assembly is inserted in the plenum 20, with wafer-shaped base 25a of standoff element 25 bearing against the top of the fuel column. The end plug 18 is then pressed against the insert 24 and fitted into the open end of cladding 17. Because this has the effect of compressing plenum spring 26, a downward axial force must be applied to hold end plug 18 in place. End plug 18 is then joined to cladding 17 by circumferential weld 22 to form a gastight seal.

End plug 18 has a pressurization hole 28 comprising a central axial bore and a radial bore in fluid communication with each other. Further, the lower end of central axial bore is in fluid communication with the plenum 20, while the radially outer end of radial bore is in fluid communication with the exterior of the fuel rod. After end plug 18 has been welded to cladding 17, plenum 20 is evacuated and then back-filled with helium via pressurization hole 28. The pressure of the helium is typically between 1 and 10 atm. The radial bore of pressurization hole 28 is then spot welded to seal plenum 20.

Figure 4:
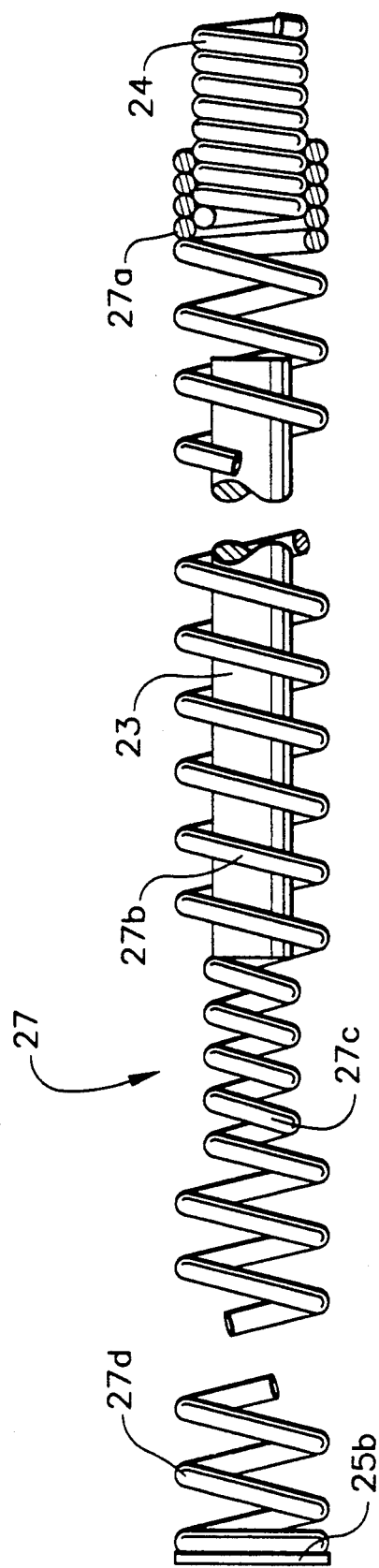
FIG. 4 is a schematic diagram showing the plenum spring and getter assembly in accordance with the preferred embodiment of the invention.

The plenum spring and getter assembly in accordance with the preferred embodiment of the invention is shown in FIG. 4. Plenum spring 27 is a wire comprising a first wound section 27b having a diameter greater than the diameter of getter 23 installed therein, a second wound section 27c having a diameter less than the diameter of getter 23 and a third wound section having a diameter equal to the diameter of the first wound section. The wound sections 27b, 27c and 27d are connected in series along an axis, with the second wound section 27c situated intermediate the first and third wound sections 27b and 27d. The diameter of the first and third wound sections is slightly smaller than the internal diameter of the fuel cladding to provide support for the cladding against the pressure inside the reactor core. A tightly wound section 27a is connected to one end of wound section 27b for receiving a conventional screwed-in insert 24. The wound section 27d ends in a turn disposed substantially perpendicular to the axis of the plenum spring, which turn has a wafer-shaped base 25b welded thereto for abutting the fuel column.

When the fuel rod is installed upright in the reactor, the getter 23 bears against and is supported by the first turn of second wound section 27c, which is necked relative to wound sections 27b and 27d of the plenum spring. Thus, the necked portion 27c of plenum spring 27 performs the function of the prior art standoff wire by supporting the getter at a desired height above the fuel column. This is an improvement over the conventional plenum spring and getter assembly because fewer components are required and the fuel rod in accordance with the invention can be manufactured at reduced cost.

I claim:

1. In a nuclear fuel rod comprising:
   a cylindrical housing having first and second open ends;
   a first end plug joined to said housing to close said first open end;
   a second end plug joined to said housing to close said second open end;
   a plurality of cylindrical nuclear fuel pellets stacked with opposing ends of adjacent pellets in abutment to form a fuel column, a first nuclear fuel pellet at one end of said fuel column being in abutment with said second end plug and a last nuclear fuel pellet at the other end of said fuel column being separated from said first end plug by a plenum space;
   a plenum spring arranged in said plenum space for urging said last nuclear fuel pellet toward said second end plug; and
   getter means arranged in said plenum space for removing contaminants from the fluid therein,
   the improvement wherein said plenum spring is a wire comprising a first wound section having a first diameter, a second wound section having a second diameter, a third wound section having a third diameter, a first connecting section for connecting said first and second wound sections and a second connecting section for connecting said second and third wound sections, said first diameter and said third diameter being greater than said second diameter.

2. The nuclear fuel rod as defined in claim 1, wherein said first diameter is equal to said third diameter.

3. The nuclear fuel rod as defined in claim 1, wherein said getter means comprises a substantially cylinder-shaped gas-permeable container containing getter material, said container having a diameter less than said first diameter and greater than said second diameter and being arranged inside said first wound section of said plenum spring.

4. The nuclear fuel rod as defined in claim 3, wherein said first wound section of said compression spring is closer to said first end plug than is said third wound section of said plenum spring.

5. The nuclear fuel rod as defined in claim 2, wherein said first diameter is slightly less than the internal diameter of said cylindrical housing.

6. The nuclear fuel rod as defined in claim 1, wherein said getter means is supported at a predetermined elevation above said fuel column by a first turn of said second wound section of said plenum spring when said fuel rod is in an upright position.

7. In a nuclear fuel rod comprising:
   a cylindrical housing having first and second open ends;
   a first end plug joined to said housing to close said first open end;
   a second end plug joined to said housing to close said second open end;
   a plurality of cylindrical nuclear fuel pellets stacked with opposing ends of adjacent pellets in abutment to form a fuel column, a first nuclear fuel pellet at one end of said fuel column being in abutment with said second end plug and a last nuclear fuel pellet at the other end of said fuel column being separated from said first end plug by a plenum space;
   a plenum spring arranged in said plenum space for urging said last nuclear fuel pellet toward said second end plug; and
   getter means arranged in said plenum space for removing contaminants from the fluid therein,
   the improvement wherein said plenum spring is a wire comprising a first wound section having a first diameter, a second wound section having a second diameter, a third wound section having a third diameter, a first connecting section for connecting said first and second wound sections and a second connecting section for connecting said second and third wound sections, said first diameter being greater than said second diameter, wherein said wire of said plenum spring comprises a fourth wound section connected to said first wound section, adjacent turns of said fourth wound section having no space therebetween.

8. The nuclear fuel rod as defined in claim 5, wherein said plenum spring is made of stainless steel and said first end plug is made of zirconium alloy, further comprising a wound wire insert made of zirconium alloy, said wound wire insert being designed to screw into said fourth wound section of said plenum, said wound wire insert have a length greater than the length of said fourth wound section so that said wound wire insert bears against said first end plug tube without contact between said first end plug and said plenum spring.

9. A plenum spring and getter assembly comprising:
   getter means for removing contaminants from fluid coming in contact therewith; and a plenum spring for supporting said getter means at a predetermined position along the length of said plenum spring, wherein said plenum spring is a wire comprising a first wound section having a first diameter, a second wound section having a second diameter, a third wound section having a third diameter, a first connecting section for connecting said first and second wound sections and a second connecting section for connecting said second and third wound sections, said first diameter and said third diameter being greater than said second diameter.

10. The plenum spring and getter assembly as defined in claim 9, wherein said first diameter is equal to said third diameter.

11. The plenum spring and getter assembly as defined in claim 9, wherein said getter means comprises a substantially cylinder-shaped gas-permeable container containing getter material, said container having a diameter less than said first diameter and greater than said second diameter and being arranged inside said first wound section of said plenum spring.

12. The plenum spring and getter assembly as defined in claim 9, wherein said getter means is supported by a first turn of said second wound section of said plenum spring.

13. A plenum spring and getter assembly comprising:
getter means for removing contaminants from fluid coming in contact therewith; and
a plenum spring for supporting said getter means at a predetermined position along the length of said plenum spring,
wherein said plenum spring is a wire comprising a first wound section having a first diameter, a second wound section having a second diameter, a third wound section having a third diameter, a first connecting section for connecting said first and second wound sections and a second connecting section for connecting said second and third wound sections, said first diameter being greater than said second diameter, wherein said wire of said plenum spring comprises a fourth wound section connected to said first wound section, adjacent turns of said fourth wound section having no space therebetween.

14. A nuclear fuel rod comprising:
a cylindrical housing having first and second open ends;
a first end plug joined to said housing to close said first open end;
a second end plug joined to said housing to close said second open end;
a plurality of cylindrical nuclear fuel pellets stacked with opposing ends of adjacent pellets in abutment to form a fuel column, a first nuclear fuel pellet at one end of said fuel column being in abutment with said second end plug and a last nuclear fuel pellet at the other end of said fuel column being separated from said first end plug by a plenum space;
a plenum spring arranged in said plenum space for urging said last nuclear fuel pellet toward said second end plug, said plenum spring being a wire comprising a first wound section having a first diameter, a second wound section having a second diameter, a third wound section having a third diameter, a first connecting section for connecting said first and second wound sections and a second connecting section for connecting said second and third wound sections, said first diameter and said third diameter being greater than said second diameter; and
a substantially cylinder-shaped gas-permeable container containing getter material arranged in said plenum space for removing contaminants from the fluid therein, said container having a diameter less than said first diameter and greater than said second diameter and being arranged inside said first wound section of said plenum spring.

15. The nuclear fuel rod as defined in claim 14, wherein said first diameter is equal to said third diameter.

16. The nuclear fuel rod as defined in claim 14, wherein said first wound section of said compression spring is closer to said first end plug than is said third wound section of said plenum spring.

17. The nuclear fuel rod as defined in claim 15, wherein said first diameter is slightly less than the internal diameter of said cylindrical housing.

18. The nuclear fuel rod as defined in claim 14, wherein said container containing getter material is supported at a predetermined elevation above said fuel column by a first turn of said second wound section of said plenum spring when said fuel rod is in an upright position.

19. A nuclear fuel rod comprising:
a cylindrical housing having first and second open ends;
a first end plug joined to said housing to close said first open end;
a second end plug joined to said housing to close said second open end;
a plurality of cylindrical nuclear fuel pellets stacked with opposing ends of adjacent pellets in abutment to form a fuel column, a first nuclear fuel pellet at one end of said fuel column being in abutment with said second end plug and a last nuclear fuel pellet at the other end of said fuel column being separated from said first end plug by a plenum space;
a plenum spring arranged in said plenum space for urging said last nuclear fuel pellet toward said second end plug, said plenum spring being a wire comprising a first wound section having a first diameter, a second wound section having a second diameter, a third wound section having a third diameter, a first connecting section for connecting said first and second wound sections and a second connecting section for connecting said second and third wound sections, said first diameter being greater than said second diameter; and
a substantially cylinder-shaped gas-permeable container containing getter material arranged in said plenum space for removing contaminants from the fluid therein, said container having a diameter less than said first diameter and greater than said second diameter and being arranged inside said first wound section of said plenum spring, wherein said wire of said plenum spring comprises a fourth wound section connected to said first wound section, adjacent turns of said fourth wound section having no space therebetween.

20. The nuclear fuel rod as defined in claim 17, wherein said plenum spring is made of stainless steel and said first end plug is made of zirconium alloy, further comprising a wound wire insert made of zirconium alloy, said wound wire inserted being designed to screw into said fourth wound section of said plenum, said wound wire insert have a length greater than the length of said fourth wound section so that said wound wire insert bears against said first end plug tube without contact between said first end plug and said plenum spring.

* * * * *